United States Patent
Moon et al.

(10) Patent No.: US 6,577,608 B1
(45) Date of Patent: Jun. 10, 2003

(54) COMMUNICATION CONTROL DEVICE AND METHOD FOR CDMA COMMUNICATION SYSTEM

(75) Inventors: Hi-Chan Moon, Seoul (KR); Jeong-Gu Lee, Kyonggi-do (KR); Jae-Min Ahn, Seoul (KR); Young Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/375,944

(22) Filed: Aug. 17, 1999

(30) Foreign Application Priority Data

Aug. 17, 1998 (KR) .............................................. 98-33861

(51) Int. Cl.[7] .......................... H04B 7/216; G08C 17/00
(52) U.S. Cl. ...................... 370/311; 370/342; 370/441; 455/343; 455/574
(58) Field of Search ................................ 370/208, 311, 370/320, 335, 342, 441; 455/343, 522, 422, 574

(56) References Cited

U.S. PATENT DOCUMENTS

| | | | | |
|---|---|---|---|---|
| 5,596,570 A | | 1/1997 | Soliman | |
| 5,802,110 A | * | 9/1998 | Watanabe et al. | 455/522 |
| 5,898,682 A | * | 4/1999 | Kanai | 370/342 |
| 6,038,263 A | * | 3/2000 | Kotzin et al. | 370/208 |
| 6,111,865 A | * | 8/2000 | Butler et al. | 370/335 |
| 6,138,034 A | * | 10/2000 | Willey | 455/574 |
| 6,421,540 B1 | * | 7/2002 | Gilhousen et al. | 370/335 |

* cited by examiner

Primary Examiner—Quochien Vuong
(74) Attorney, Agent, or Firm—Dilworth & Barrese LLP

(57) ABSTRACT

A device and method for communicating a common channel message in a CDMA communication system. The device comprises a base station transmitter and a common channel transmitter. The base station transmitter includes a specific channel transmitter for outputting a channel signal at a second transmission power level for a predetermined time duration and otherwise outputting the channel signal at a first transmission power level. The common channel transmitter transmits a common channel message at an assigned slot duration. A power supply voltage is provided to the receiver of the mobile station for the predetermined time duration and the assigned slot duration to enable the receiver. The power supply voltage to the receiver is otherwise disengaged from the power supply so as to allow the receiver to operate in a sleep mode.

19 Claims, 14 Drawing Sheets

COMMUNICATION CONTROL DEVICE AND METHOD FOR CDMA COMMUNICATION SYSTEM

BACKGROUND OF THE INVENTION

1. Field of the Invention

The present invention relates generally to CDMA communication systems, and in particular, to a device and method for controlling slotted mode communication.

2. Description of the Related Art

In a code division multiple access (CDMA) communication system, a forward link includes a pilot channels, a sync channel, a paging channel and a traffic channel. By using these channels, a base station and a plurality of mobile stations acquire sync of PN spreading codes and establish call channels.

Upon power on, the mobile station acquires a pilot signal, having the highest power, out of plurality of pilot signals received over the forward channels, and demodulates a sync channel message to acquire a reference time. Once a reference time is established the mobile station will thereafter perform demodulation. After receipt of the sync channel message, the mobile station can operate in a slotted mode wherein the mobile station periodically monitors a paging channel to check whether a paging message has been transmitted from a base station. Upon receipt of a paging message from a base station, the mobile station makes a transition to an active state where the mobile station can provide the call service using a traffic channel. However, if the mobile station does not receive the paging message, the mobile station enters a sleep mode where it cuts off a power supply voltage being provided to demodulation-related hardware, such as an RF (Radio Frequency)/analog part, searcher, finger and combiner, to disable the demodulation-related hardware.

Upon entering the sleep mode, the mobile station checks whether a paging message for it has been received from a base station, as stated above. The base station can transmit a paging message to the mobile station in either a slotted mode or a non-slotted mode. In either mode the message is transmitted in a unit of superframe having a length of 80 ms, which is called a slot. The 80 ms superframe includes information about a paged mobile station, information about the base station and a list of neighbor sectors of the mobile station.

To determine whether a paging message for a specified mobile station has been received or not, the mobile station should monitor paging channel slots transmitted from the base station. If the mobile station does not know when the paging message for it will be received, the mobile station should monitor all the slots that the base station transmits. Such a paging mode is called a non-slotted mode in which a time slot, at which a paging message for a specific mobile station will be transmitted, is not specified, requiring that the mobile station s monitor all the slots.

However, when a paging message for a specific mobile station is transmitted only at a predetermined specific slot, the mobile station can monitor only the corresponding specific slot and, instead of demodulating a paging channel message for other time slots, and cut off a power supply voltage being provided to the CDMA demodulation-related hardware to enter the sleep mode. As stated above, in the slotted mode, the mobile station can operate in the sleep mode for the period of time that the receiving stage is disabled. FIG. 1 illustrates a message slot assigned to a specific mobile station transmitted in one cycle from a base station for a communication system operating in the slotted mode, and a monitoring time for which the mobile station monitors the slot assigned to itself.

Referring to FIG. 1, a base station transmits a paging channel message for a specified mobile station at a specific slot for the paging channel (11). The specified mobile station then provides a power supply voltage to an RF/analog circuit beginning at a time preceding the start time of the specific slot for the paging channel (12), and enables a searcher (13). After search of the base station using the searcher, the mobile station assigns a finger to receive the paging channel message (14).

FIG. 2 illustrates a method for receiving the above-stated paging channel message. FIG. 2 shows a case where a sixth slot is assigned to the mobile station and a slot cycle is 16 slots (i.e., 1.28 seconds). Further, for a duration A, the mobile station is awaken from the sleep mode several tens of milliseconds before the sixth paging slot, for demodulation of the paging slot, provides power to the RF/analog circuit, searches base station pilot signals, and assigns multipath signals for an acquired pilot signal to a finger.

In an existing IS-95 system, a base station can operate either in the slotted mode or the non-slotted mode, but it is a system designer's option whether to support the slotted mode or the non-slotted mode. However, when the base station operates in the slotted mode, the mobile station can increase the standby time by demodulating the paging channel at the pre-assigned time slot, taking into consideration the limited batter capacity of the mobile station. That is, the mobile station monitors only a slot at which a paging message for it is to be received and, for the other time slots, cuts off the power supply voltage of the RF/analog circuit and the demodulation-related module thereof, thereby to increase the standby time.

As previously stated, FIGS. 1 and 2 illustrate a paging slot transmission time of a base station and an operating duration of a mobile station in an existing IS-95 system, wherein the base station and the mobile station both operate in the slotted mode. For demodulation of a paging slot assigned to it, the mobile station is awaken from the sleep mode several tens of milliseconds before the pre-specified paging slot, to search a base station from which the paging slot is to be transmitted.

The RF/analog circuit of the mobile station is awaken from the sleep mode to operate in a stable state (12). Thereafter, the searcher of the mobile station is awaken from the sleep mode to detect correlation and energy between a received signal and a PN (Pseudo Noise) spreading code of the mobile station so as to detect a pilot signal received with sufficiently high energy (13). The mobile station repeats the steps of energy detection and comparison of the detected energy with a threshold for those sectors registered in an active sector list and a neighbor sector list until a single pilot signal is acquired which exceeds the threshold in energy. Upon failure to acquire a pilot signal having sufficiently high energy, the mobile station cannot normally demodulate the paging slot. However, upon receipt of a pilot signal having a sufficiently high energy, the mobile station assigns the multipath components of the acquired pilot signal to a finger to attempt demodulation of the paging slot (14). Subsequent to a paging message being detected through demodulation, the mobile station then makes a transition to a traffic channel state to establish a communication link. However, when a paging message is not detected, the mobile station enters the sleep mode again till the next paging slot to save power.

Here, the mobile station determines the period between the slots at which a paging message for a specific mobile station is to be transmitted and notifies the determined period to the base station through a registration procedure. The paging slots are assigned with unique numbers from 0 to 2047, and a slot to be first monitored is determined by a Hash function unique to each mobile station.

A mobile station may alternately determine a period between slots by changing a slot cycle index (SCI) according to a reacquisition algorithm for a pilot signal. The relationship between an actual inter-slot period and the SCI is defined as Slot Period=16*2SCI [slots], where SCI=0,1,2,3,4,5,6 and 7.

As illustrated in FIG. 2, when the sixth slot is to be first monitored and SCI=0 (i.e., the period between slots is 16), the mobile station enters the sleep mode for the slot time from the sixth slot to the twenty-second slot to save the power.

In enabling the mobile station to operate in the slotted mode, it is important for the mobile station to perform a reacquisition procedure for searching a pilot signal for those sectors registered in the active sector and neighbor sector lists to monitor the next paging slot, after completion of the sleep mode. That is, it is necessary to acquire timing upon completion of the sleep mode to acquire an active sector for receiving a paging message. In implementing a receiver of the existing IS-95 system, 3 PN ROLL (1 PN ROLL (the period of PN spreading code)=26.7 ms), i.e., 80 ms is assigned for the above operation. The mobile station should complete determination of an active sector for data demodulation and accurate timing acquisition, within 80 ms. However, when the mobile station fails to determine an active sector and cannot perform reacquisition due to a bad channel condition, the 80 ms superframe is not enough to perform the reacquisition procedure for 20 neighbor sectors in maximum. In this case, the mobile station cannot correctly receive the paging message. That is, in the existing IS-95 system, reduction in reacquisition time to achieve a battery saving may cause loss of sync and failure to receive a paging message. In particular, as the neighbor sectors to be managed increase in number, it is difficult to acquire a pilot signal from a neighbor sector, having a good receiving condition, within 80 ms.

Further, the IS-95 system has another problem of idle search for set maintenance, performed for the 80 ms slot time where a paging channel message is received. In the IS-95 system, the mobile station performs the search operation for one sector in the active sector or neighbor sector list in the following pattern, while the mobile station stays in the paging state.

$$A \rightarrow N1 \rightarrow A \rightarrow N2 \rightarrow \cdots \rightarrow A \rightarrow R$$

Here, R represents remaining sectors other than the active sectors and the neighbor sectors.

The active sector and neighbor sector lists are updated by performing the pilot channel search operation in the above stated order. In order to deal with a variation in channel condition of a mobile station and a change of adjacent base stations, the search operation should be frequently performed. However, an increase in the SCI increases the time of the sleep mode. For this reason, it is difficult to frequently perform the idle search during the 80 ms paging slot. Therefore, it is not possible to search and manage the active sectors or neighbor sectors by rapidly responding to the variation in peripheral environments, which causes a difficulty in acquiring a good active sector or neighbor sector in a reacquisition procedure for receiving a paging slot. As a result, it is not possible to demodulate the paging message. That is, it might be difficult to perform an effective set maintenance for an SCI having a sufficiently high value. However, maintaining the SCI at a low value does not coincide with the goal of power saving in the slotted mode. That is, reducing the time, for which the sleep mode continues, is disadvantageous to power saving. Further, in a micro-cellular or pico-cellular system having small-sized cells, the problem becomes more serious. That is, when the mobile station is awaken from the sleep mode to monitor the paging slot, since the mobile station has already passed many cells, the previous list of the neighbor cells may become useless. As a result, the mobile station may lose sync and therefore cannot respond to the paging, so that it should return to an initial sync acquisition state.

As described above, operation in the paging channel state and the slotted state, and a transition method and a protocol between the two states suffer from multiple problems making it an inappropriate solution for an IMT-2000 system environment.

SUMMARY OF THE INVENTION

It is, therefore, an object of the present invention to provide a device and method for performing communication in a slotted mode in a CDMA communication system.

It is another object of the present invention to provide a device and method for performing set maintenance and reacquisition by employing a new pilot signal transmission method and a new slotted mode to secure an effective slotted mode operation in a CDMA communication system.

It is a further object of the present invention to provide a device and method for enabling a mobile station to acquire and manage signals from an increased number of neighbor base stations in a CDMA communication system employing a slotted mode.

It is still another object of the present invention to provide a device and method for acquiring signals from neighbor base stations by a mobile station with reduced power consumption and complexity in a CDMA communication system employing a slotted mode.

It is a further object of the present invention to provide a device and method for acquiring signals from neighbor base stations by a mobile station with reduced power consumption and complexity which is in an idle state, in a CDMA communication system.

It is still another object of the present invention to provide a device and method for acquiring and managing signals from an increased number of neighbor base stations to save battery power by enabling a mobile station to store received signals in a memory thereof in a CDMA communication system.

It is still another object of the present invention to provide a device and method for storing sample data of a pilot signal in a memory during a sleep mode to perform a search operation and performing sector selecting and finger assignment for demodulation of a quick paging channel according to the search result, by employing a new pilot signal transmission method in a CDMA communication system adopting a slotted mode.

It is still another object of the present invention to provide a device and method for increasing energy of a pilot signal for a short time to perform set maintenance by enabling only a searcher during a sleep mode for that time, and for saving power by increasing a probability of pilot signal acquisition and thus reducing an acquisition time in a CDMA communication system employing a slotted mode.

To achieve the above object, a device for communicating a common channel message in a CDMA communication system includes a base station transmitter including a specific channel transmitter for outputting a channel signal with second transmission power at a predetermined time duration and outputting the channel signal with first transmission power at other time duration, and a common channel transmitter for transmitting a common channel message at an assigned slot duration; and a receiver of a mobile station, wherein a power supply voltage is provided to the receiver at the duration where the specific channel is received with the second transmission power and the assigned slot duration to enable the receiver, wherein the power supply voltage to the receiver is cut off at other duration so as to allow the receiver to operate in a sleep mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

For a pilot search operation performed during a superframe (herein, the superframe is assumed to be 80 ms) for receiving a message on a paging channel, an embodiment of the present invention stores a received pilot signal in a memory and thereafter, disables an RF/analog circuit and enables only a searcher. Accordingly, the mobile station can perform an effective set maintenance and, this can be applied to reacquisition for demodulation of a paging slot. The base stations transmit pilot signals with a higher than normal pilot power for several-symbol times (e.g., 1 to 4 symbol time) beginning at a predetermined time, so as to minimize power consumption of a searcher in a mobile station receiver and reduce a search time. By instantaneously increasing the power of a pilot signal, the mobile station reduces the time required in the reacquisition process for receiving a paging slot, thereby contributing to power saving.

A description of the embodiment above will be restricted to a paging channel state and a slot mode. However, the invention is applicable to all cases where a message is transmitted only at a predetermined slot and is not transmitted at the other slots in a forward link of a CDMA communication system.

Embodiments of the present invention will be described in detail below with reference to the accompanying drawings. More specifically, with reference to FIGS. 3 to 5, a description will be made regarding a method for receiving a paging signal in a slotted mode according to an embodiment of the present invention; with reference to FIGS. 6 to 8, a description will be made regarding a property of a pilot channel transmitted from a base station according to an embodiment of the present invention; with reference to FIG. 9, a description will be made regarding a channel transmitter in a base station and a channel transmission method thereof; with reference to FIGS. 10 to 14, a description will be made regarding a method for receiving a pilot channel signal and a paging channel signal at a receiver of a mobile station.

First, a description will be made regarding a method for communicating a paging channel signal in a slotted mode in a CDMA communication system according to an embodiment of the present invention.

Figure 1:
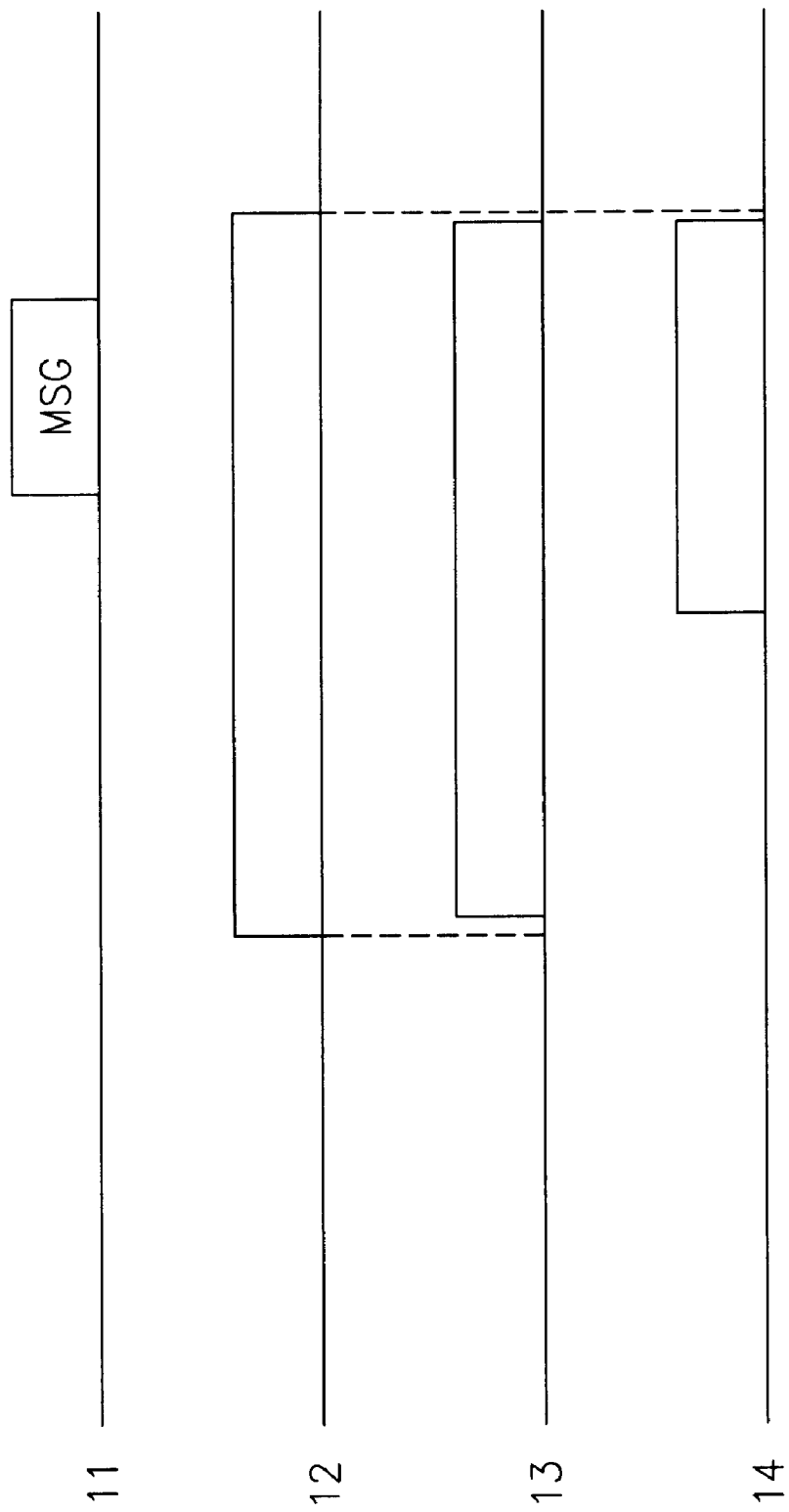
FIG. 1 is a diagram illustrating a method for receiving a paging channel in a conventional slotted mode in a CDMA communication system.
Figure 2:
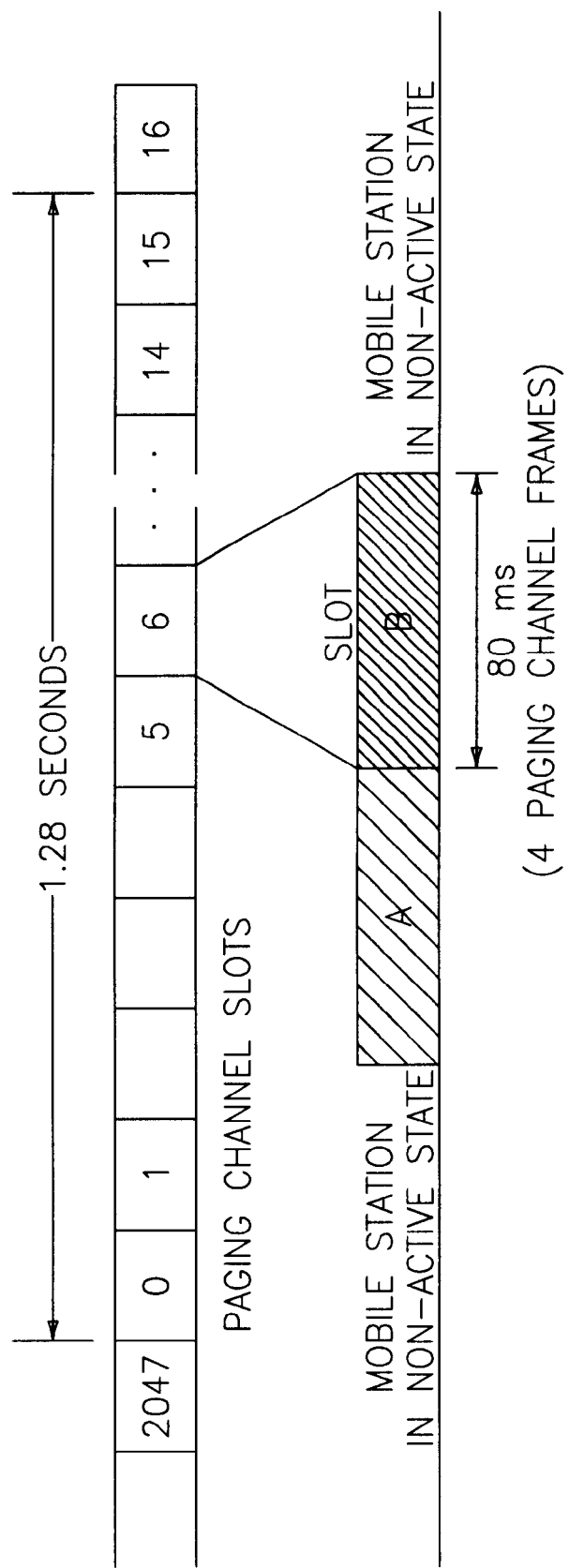
FIG. 2 is a diagram illustrating a paging operation of a mobile station in a conventional slotted mode, wherein a sixth slot is determined to be first monitored and a slot period is 16.
Figure 3:
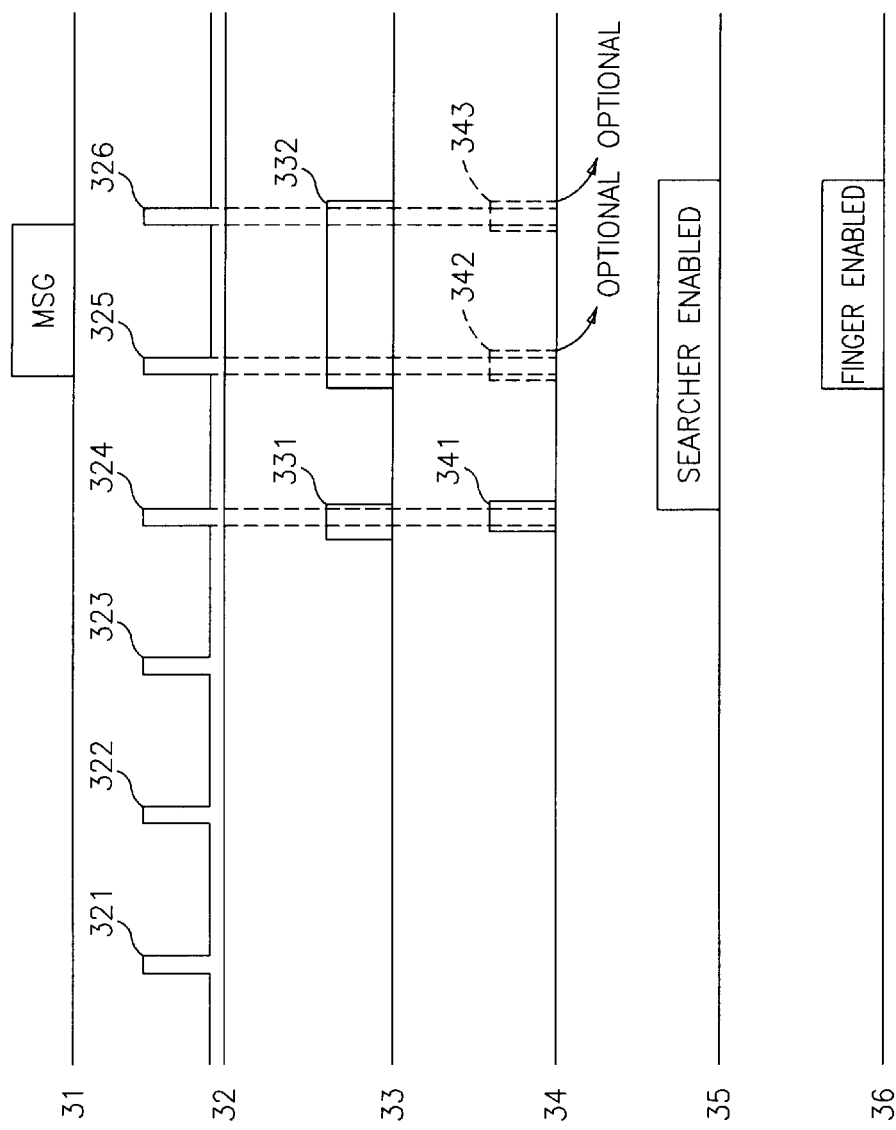
FIG. 3 is a diagram illustrating a method for receiving a slot paging channel according to an embodiment of the present invention.

Referring to FIG. 3, a base station transmits a paging message for a specific mobile station over a paging channel at a predetermined period as represented by reference numeral 31. That is, a paging channel transmitter of the base station transmits the paging signal for the specific mobile station at a paging slot duration previously scheduled with the mobile station. By previously scheduling the time slot of the paging message for the specific mobile station, the mobile station can make a transition to a sleep mode for all other slot times (i.e. non-scheduled time slots) to save battery power. The mobile station demodulates the paging message at the paging slot duration and simultaneously, performs an idle search for set maintenance and handoff. However, it is difficult for the mobile station to perform prompt set maintenance by simply depending on the idle search performed at every paging slot. To solve this problem, the base station periodically outputs pilot signals at time slots 321–326 at a higher than normal power as represented by reference numeral 32. That is, in the present embodiment a new pilot channel transmission method is utilized for periodically transmitting pilot signals having power higher than the normal transmission power over the pilot channel. Here, to generate the high power pilot signal the base station can either increase transmission power of the pilot signal or use a separate channel transmitter for generating the high power pilot signal. In addition, a transmission period of the high power pilot signal can be identical to a duration of the paging channel.

The mobile station then performs set maintenance at a time other than the paging slot duration using the previously received higher power pilot signal, to rapidly and accurately update the active sector and neighbor sector lists. That is, when the base station transmits the high power pilot signals at paging slots 321–326, the mobile station enables an RF receiver by providing a power supply voltage for the transmission duration of the pilot signal 324. The assigned paging slot is represented as by reference numeral 31. Further, the mobile station samples several symbols of the pilot signal (e.g. 325, 326) received at around the time where the RF receiver is provided with the power supply voltage, and stores the sampled data in a memory. Therefore, in the mobile station, an RF/analog stage is awaken from the sleep mode at a duration 331 preceding a target pilot signal duration and enables a searcher at a duration shown by reference numeral 35 to perform channel tuning. Furthermore, after storing the sampled data at the duration 341, the mobile station disables the RF/analog stage by cutting off the power supply voltage, to save power. Thereafter, the mobile station again provides the power supply voltage to the RF/analog stage at a duration 332 and enables a finger as represented by reference numeral 36. The mobile station can store pilot signals 342 and 343 received at the paging slot duration 332 in a memory. Since the pilot signals have high power, it is possible to reduce a correlation time during the search process, reducing the total search time. The reduction in search time can contribute to reduction in power consumption of the searcher.

As described above after storage of sample data, the searcher in the mobile station is awoken from the sleep mode to start the search operation as represented by reference numeral 35. Since the mobile station has received the high power pilot signal 324, the searcher can detect sufficient energy even though the correlation duration is not long. Therefore, it is possible to search a greater number of neighbor base stations for a shorter search time. For this search time, the mobile station can subsequently perform the idle search, which was completed at a previous paging slot. Since the mobile station searches the neighbor sectors in the state where only the searcher is enabled and the RF/analog stage and the finger are disabled, it is possible to reduce power consumption that the mobile station requires in searching the pilot signals. For this search time, a reacquisition process for demodulation of the paging slot is also performed. That is, the mobile station updates the active sector and neighbor sector lists through the search performed in the state where the RF/analog stage is not provided with the power supply voltage, and can either select a single active sector for demodulating the paging slot from the updated sector information or select several sectors having high energy. The mobile station performs reacquisition using the selected one or several sectors. Therefore, by performing reacquisition using only the selected sectors to determine an active sector, the mobile station can minimize its power consumption and reduce a reacquisition time, thus saving the battery power.

The mobile station performs the search operation in the state where the RF/analog stage is not provided with the power supply voltage, and performs reacquisition for an operating duration of the searcher, to either acquire an active sector or determine several sectors having high energy. When all the active set and neighbor set are searched, the search operation is ended. When there is a remaining time till the paging slot, the mobile station can return to the sleep mode.

The operating duration of the finger in the mobile station, shown by reference numeral 36, begins at an instant where the searcher acquires an active sector through reacquisition and detects a multipath component to assign the detected multipath component to the finger. For demodulation, a combiner should be also enabled at this time.

In summary of the method of the present embodiment, in addition to the reacquisition process as a pre-operation for demodulation of the paging slot, the searcher receives the high power pilot signal received for the time duration defined by slots 321–326 to perform the search operation, thereby securing effective set maintenance and reducing a reacquisition time.

Here, since the operating duration of the searcher is not so long, the searcher is awaken from the sleep mode only for the sampling duration and the other demodulation modules remains in the sleep mode, the power consumption can be reduced. This effective set maintenance reduces the duration for reacquisition performed prior to reaching the paging slot, thereby additionally reducing the power consumption. Further, one or several sectors having high energy are previously selected in the search process performed immediately before the paging slot duration (in a state where the RF/analog stage is not provided with the power supply voltage) and thereafter, only the selected sectors are searched for the reacquisition duration to reduce the reacquisition time, thereby reducing the battery power.

The pilot signal transmission method described above and an associated sleep mode operation of the mobile station can be effectively applied to transmitting and receiving a quick paging channel proposed for an IMT-2000 system. The quick paging channel is a newly proposed physical channel for predetermining notifying the mobile station whether a paging message for the mobile station will be transmitted or not at the next paging slot. That is, in operation a base station transmits one or two symbols, which are not coded and interleaved, over the quick paging channel at a predetermined time, a mobile station controls the sleep mode by demodulating the symbols received through the quick paging channel. For example, when the quick paging channel symbols are all "1"s which indicates that a paging message will be transmitted from the base station at the next paging slot, the mobile station prepares for demodulation of the paging message. Otherwise, when the quick paging channel symbols are all "0"s which indicates that a paging message will be transmitted at the next paging slot, the demodulation-related modules are not required to be awaken from the sleep mode. The quick paging channel can be demodulated, for example, by on-off keying (OOK).

Figure 4:
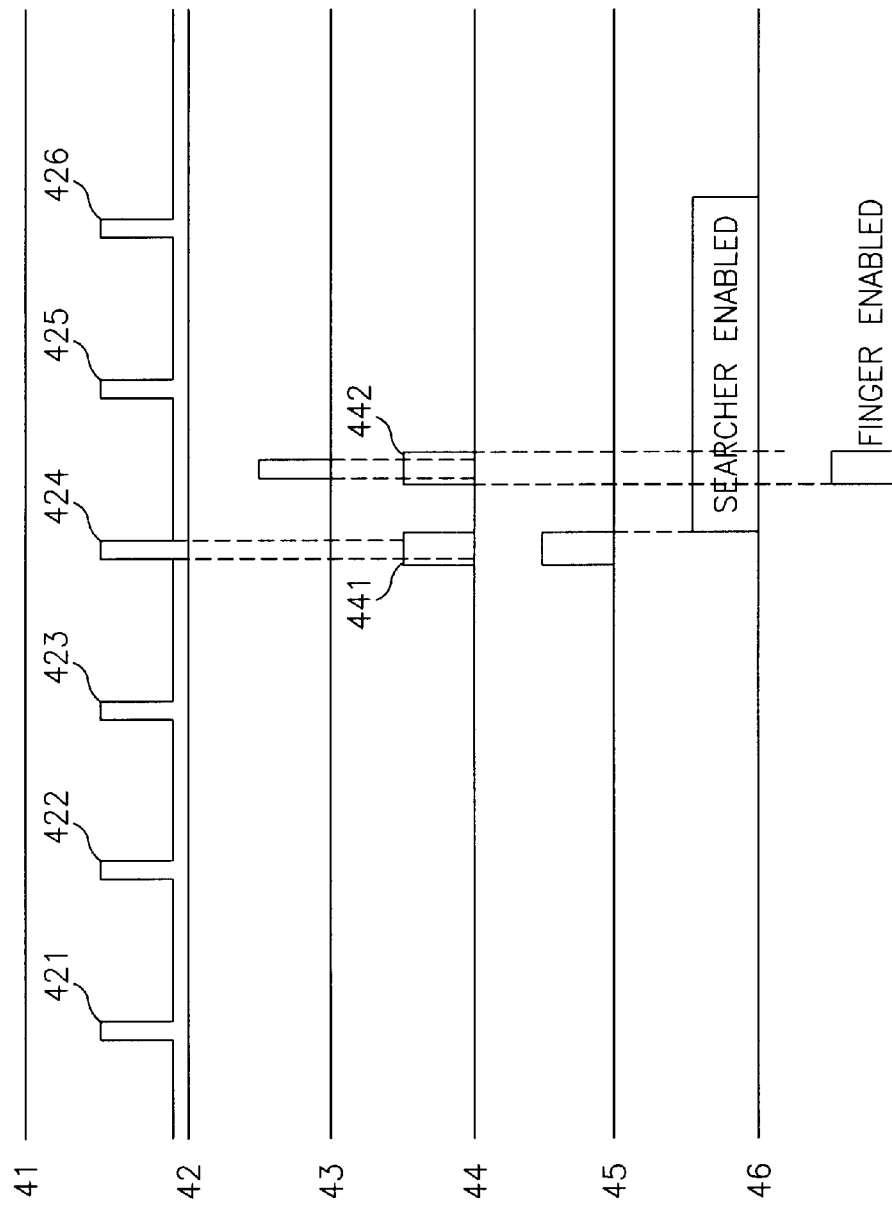
FIG. 4 is a diagram illustrating a method for receiving a paging channel using a quick paging channel when there is no paging message according to an embodiment of the present invention.
Figure 5:
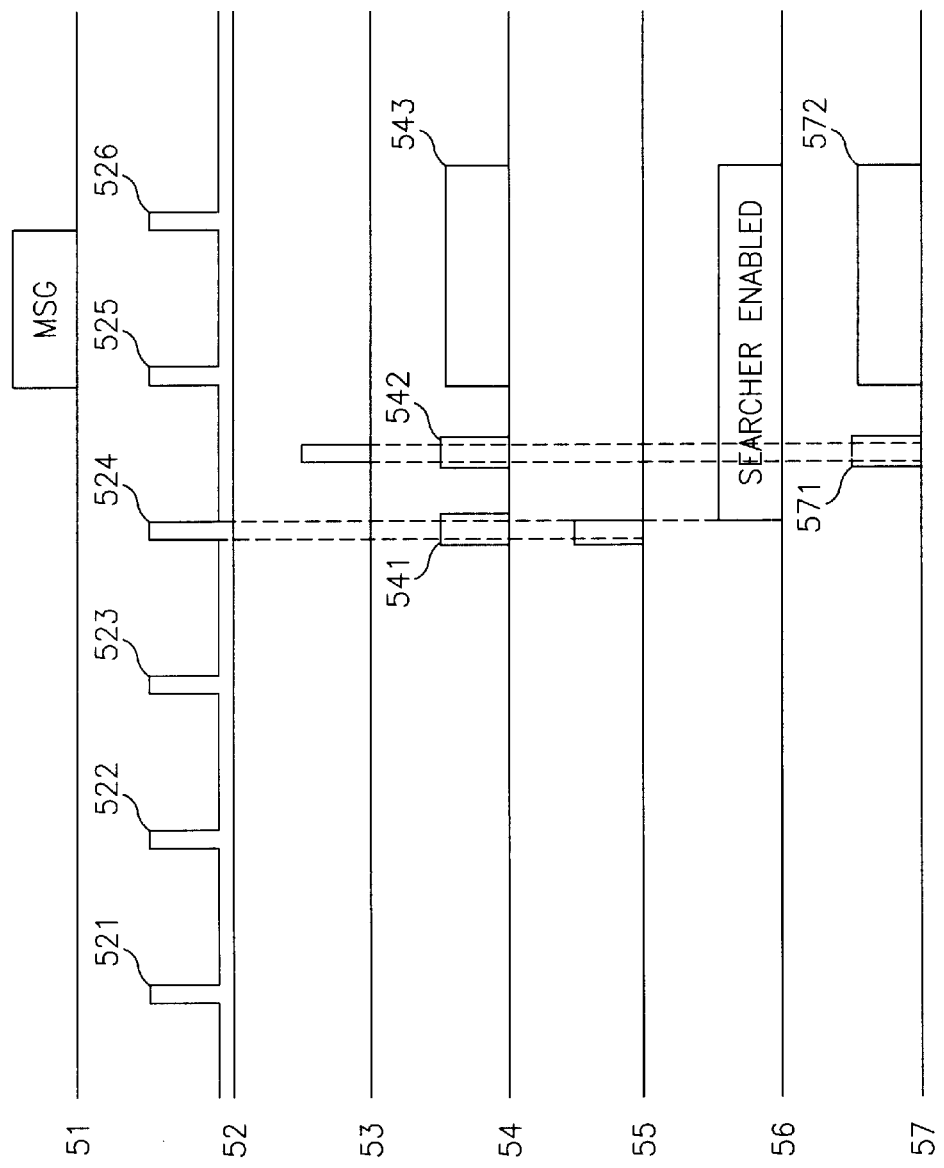
FIG. 5 is a diagram illustrating a method for receiving a paging channel using a quick paging channel when there is a paging message, according to an embodiment of the present invention.

FIGS. 4 and 5 are timing diagrams illustrating how a base station transmits information bits on the quick paging channel. Although FIGS. 4 and 5 show the case where the quick paging channel is transmitted only one time, the method can be applied even to the case where the quick paging channel is repeatedly transmitted several times. For demodulation of the quick paging channel, the mobile station performs sync acquisition using the high power pilot signals shown in FIGS. 4 and 5, transmitted from the base station. The mobile station determines an active sector by performing a search operation using the sampled data of the high power pilot signal received immediately before a quick paging channel signal is received, demodulates the quick paging channel by assigning the high power signal component received from the determined sector to a finger, and then determines whether to proceed to the paging slot. Here, it is important that the demodulation stage including the finger and the combiner should be awaken from the sleep mode at the time shown in FIGS. 4 and 5, for demodulation of the quick paging channel. The mobile station can store the input signal at any time interval before the quick paging symbol and search with the conventional pilot channel. This can increase the standby time of mobile station compared with the conventional sleep mode reacquisition operation. But, if the mobile station store the signal of the time period when base station transmitted the pilot with increased power, more increased standby time can be expected.

FIG. 4 illustrates a case where a base station notifies the mobile station that a paging message will not be transmitted at the paging slot, using the quick paging channel.

Referring to FIG. 4, the base station transmits a paging message for a specific mobile station over a paging channel in a slotted mode at stated periods. FIG. 4 shows a case where the base station does not transmit a paging message at a corresponding paging slot, as represented by reference numeral 41. Here, since a channel transmitter of the base station transmits a paging message for a specific mobile station only through a specific paging slot previously scheduled between the mobile station and the base station, the mobile station can transition to the sleep mode to save battery power. During the paging slot, the mobile station demodulates the paging message and performs an idle search for set maintenance and handoff. Further, since it is difficult for the base station to perform fast set maintenance simply depending on the idle search which is performed at every slot as stated above, the base station employs a new pilot channel transmission method for periodically transmitting pilot signals having power higher than the normal transmission power of the pilot signals over the pilot channel, as represented by reference numeral 42. Further, the channel transmitter of the base station transmits a quick paging channel message, for notifying transmission of a message, over the quick paging channel, as shown by reference numeral 43.

For the search operation, the mobile station should sample data from the high power pilot signal to be transmitted immediately before transmission of the information bit of the quick paging channel, represented by reference numeral 43, and store the sampled data. To this end, the RF/analog stage of the mobile station is awaken from the sleep mode before a transmission time of the high power pilot signal, to perform sampling and store the sample data. After storage of the sampled data, the RF/analog stage is not provided with the power supply voltage and thereafter, is awaken again from the sleep mode to demodulate the quick paging channel.

After completion of sampling, a searcher is awaken to initiate searching, as represented by reference numeral 46, and upon acquisition of a pilot signal, detects a multipath signal component to assign the detected multipath signal to a finger, in order to receive the quick paging channel. That is, the finger should be awaken from the sleep mode prior to assignment of the multipath signal to the finger, as represented by reference numeral 47, and a combiner should be also awaken to manage timing of the mobile station and to demodulate the quick paging channel information bit. In this case, however, since the paging message will not be transmitted at the present paging slot, the RF/analog stage and the demodulation-related hardware cut off the power supply voltage being provided thereto and then enter the sleep mode again for the paging slot as represented by reference numerals 44 and 47, after demodulation of the quick paging channel information bit. Of course, when the searcher fails to complete the search for this time, the searcher continues the search until a search required for set maintenance is completed.

FIG. 5 illustrates an operation of a paging channel which uses a quick paging channel information, wherein there exists a paging message. As described above, the RF/analog stage is awaken from the sleep mode at the same time as in FIG. 4, to perform sampling and store the sample data, and then enters the sleep mode again. Of course, the RF/analog stage is awaken again to demodulate the quick paging channel and, after completion of demodulation, makes a transition to the sleep mode again. Thereafter, for reacquisition of a paging slot, the RF/analog stage should be awaken again several tens of milliseconds before the paging slot. The searcher has a different operation as that of FIG. 4 in that the mobile station should provide the power supply voltage to the RF/analog stage again to receive the paging message, since the searcher has found out, from the information bit transmitted through the quick paging channel, that the paging message will be transmitted at this paging slot. The searcher should perform set maintenance and reacquisition by performing the continuous search. For receipt of the paging channel, the searcher in the mobile station can reassign the finger. This finger assignment may be different from finger assignment for the quick paging channel. This operation will continue from an instant where multipath assignment is performed by the finger and combiner or the searcher to an instant where demodulation of the paging channel is completed.

As described above, when a paging channel message is communicated in the sleep mode, the base station increases a ratio of power of the forward link pilot channel to the total transmission power of the base station for a predetermined time duration, for an effective search of a base station, and transmits a message and message existence/non-existence information over the paging channel and the quick paging channel. The mobile station then despreads the signals for this duration to detect signals from several base stations, receives multipath signals transmitted from the respective base stations to rapidly acquire channels, and then, receives the message to process.

Next, reference will be made to the properties of a pilot channel used in the embodiment of the present invention.

Figure 6:
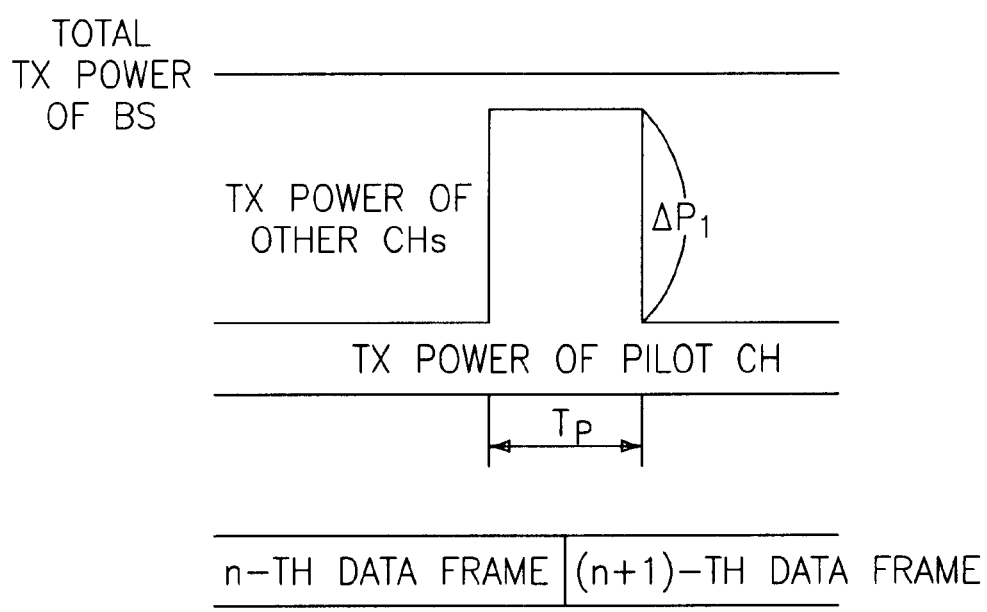
FIG. 6 is a diagram illustrating a property of a forward pilot signal for enabling a mobile station to acquire signals from several base stations by instantaneously increasing power of a pilot channel according to an embodiment of the present invention.

FIG. 6 illustrates a forward channel according to an embodiment of the present invention, wherein a ratio of transmission power of the pilot channel to the total transmission power of the base station is instantaneously increased to enable the mobile station to acquire signals from several base stations. Referring to FIG. 6, the base station increases transmission power of the pilot channel to be higher by $\Delta P1$ than the normal transmission power for a predetermined time duration Tp. The base station decreases transmission power of some traffic channels or discontinues transmission of the traffic channels, to assign the increased transmission power to the pilot channel, maintaining the total transmission power. That is, that the transmission power of the pilot channel is increased to be higher than the normal transmission power of the base station for the short time Tp. For more effective set maintenance, it is also possible to assign the total transmission power of the base station to the pilot channel for the time duration Tp.

FIG. 6 shows a case where some traffic channels are not transmitted or transmitted with low transmission power for the time duration Tp, and the time duration Tp extends over a boundary of two data frames. This is to illustrate that performance degradation caused by transmitting the traffic channels with transmission power lower than the normal transmission power extends over two data frames to prevent the performance degradation from concentrating on one data frame. In addition, to secure uniform performance of the two data frames, the duration Tp is equally divided to be Tp/2 for the respective data frames. The mobile station, which is in sync with the base station, should know the time duration Tp and its location where the base station increases the transmission power of the pilot channel.

The time duration Tp where the base station increases the transmission power of the pilot channel depends on a radio environment around the base station, arrangement of the base stations and a bandwidth for signal transmission. The longer the time duration Tp becomes, the higher the gain increases. Therefore, the mobile station can acquire even a low power pilot signal. However, when the time duration Tp becomes too long, transmission power to be assigned to the transmission data will be assigned to the pilot channel, causing a decrease in an overall capacity of the system. Therefore, it is necessary to properly control the time duration Tp according to the system condition.

For example, when the system has a hip rate of 3.6864 Mcps (chip per seconds) and a frame length of 20 ms and the time duration Tp is comprised of 2048 chips, the time duration Tp is 0.55 ms. In FIG. 6, since the time duration Tp is equally divided for the two data frames, each data frame has a duration 0.28 ms (=0.55 mm/2) where the transmission power of the pilot channel is increased to be higher than the normal transmission power. The 0.28 ms duration is very short duration which corresponds to 0.025% of the total 20 ms data frame, and performance degradation of the forward link due to this short duration is negligible.

If there are several base stations around a mobile station, the time duration Tp whereby the transmission power of the pilot channel is increased and synchronized among the respective base stations, so that several base stations can simultaneously increase the transmission power of their respective pilot channels. Alternatively, the base stations can increase the transmission power of their respective pilot channels by a rotational scheme, where each increases its power according to a predefined sequence. The time duration Tp where the transmission power of the pilot signals from the respective base stations can be either designated by the base stations or periodically designated.

Figure 7:
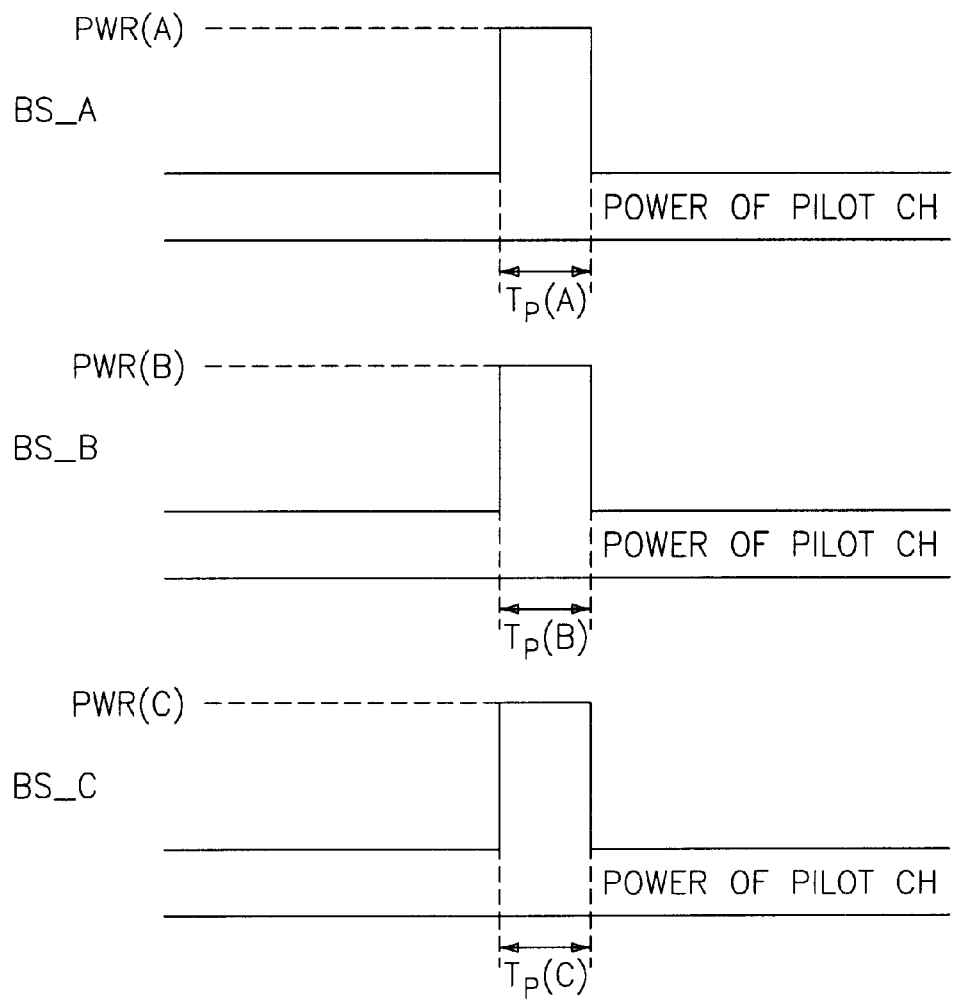
FIG. 7 is a diagram illustrating several methods for increasing the power of a pilot channel, when there are several base stations according to an embodiment of the present invention.

FIG. 7 illustrates a method for increasing the transmission power of the pilot signals in the case where several base stations are located together in a specific area and simultaneously increase the transmission power of their respective pilot signals. In this scenario, the mobile station and several base stations have previously arranged an appointment as to when to increase the transmission power of the pilot channels to be higher than the normal transmission power. Since the mobile station knows which base station will increase the transmission power of the pilot channel, it despreads a received signal with a spreading code for the corresponding pilot channel to measure a receiving level of the pilot channel. The mobile station can either simultaneously despread signals from several base stations to measure in real time power of the pilot signals received from the respective base stations, or store the received signals in a memory to despread the received signals later.

In FIG. 7, the time interval Tp where the base stations increase the transmission power may have either a fixed value or a variable value according to the base stations. This is to obtain an optimal effect by taking into consideration the topographical environment of an area where the base stations are located, and the sizes of the cells. In addition, the power levels PWR(A), PWR(B) and PWR(C) of the respective pilot channels can be equal to one another when the respective base stations have increased the transmission power of their respective pilot channels, in the case where the mobile station is in a handoff area. This is because the mobile station may have difficulty in comparing a relative power ratio of the pilot signals received from the respective base stations, if the base stations transmit the pilot signals with different transmission power.

Figure 8:
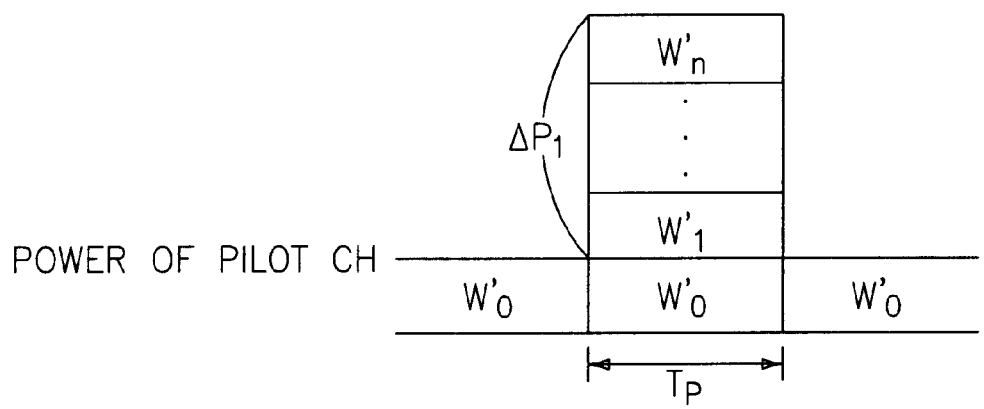
FIG. 8 is a diagram illustrating a method for distributing transmission power of a base station, wherein transmission power of a pilot channel is divided by a plurality of spreading codes according to an embodiment of the present invention.

FIG. 8 illustrates a method for distributing transmission power of a pilot channel in the case where a base station divides the transmission power of the pilot channel by several spreading codes. This method may be preferable to increasing the transmission power of the pilot channel for a short time duration because any increase in transmission power may affect a receiving part such as a channel estimator. In addition, when there exists a mobile station which does not know that transmission power of the pilot channel will be changed for the short time duration, or a mobile station which is not yet synchronized, the change in transmission power of the pilot channel may cause the mobile station to communicate with a unintended base station.

In the embodiment of FIG. 8, the increased pilot power is distributed to several code channels which are spread with different spreading codes, rather than increasing only the transmission power of the conventional pilot channel for the time duration Tp. Here, spreading codes W0", W1", . . . , Wn" are used. This pilot channel type, as well as the pilot channel types of FIGS. 6 and 7, can be applied to all the channel structure wherein the pilot channel should be transmitted with the high transmission power. Herein, to reduce interference to other receivers, transmission power used for the common pilot channel is equally assigned at both the Tp duration and the normal duration, and the increased transmission power of the pilot channel increased at the Tp duration, normally assigned to the pilot channel is instead distributed to several spreading codes. The common pilot channel refers to a pilot channel which is used in a normal state at a time duration other than the Tp duration.

When the transmission power of the pilot channel is distributed to several different spreading codes, a pilot channel signal P(t) can be expressed as $$P(t)=G0^*C0(t)+G1^*C1(t)+ \ldots +Gn^*Cn(t)$$

where Gn represents a gain of the respective channel and Cn(t) represents a spreading code for the respective pilot channel. In this formula, it is assumed that a pilot signal is transmitted through (n+1) different code channels. Gain Gn of the respective channels can be expressed in the form of a complex number. In addition, orthogonal codes are used for the spreading code Cn(t) for the respective code channel.

Next, reference will be made to a channel transmitter of a base station transmitter according to an embodiment of the present invention.

Figure 9:
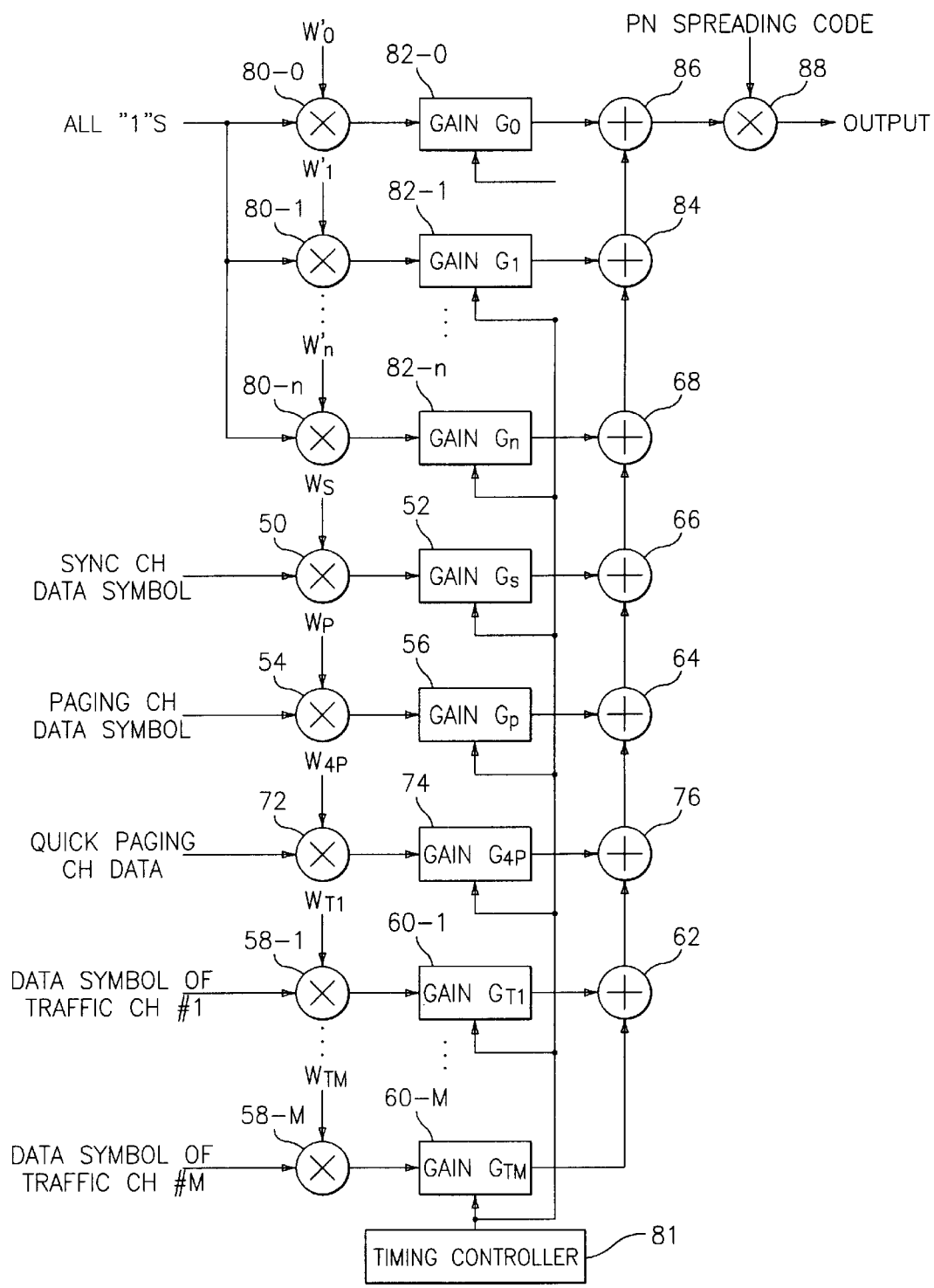
FIG. 9 is a diagram illustrating a channel transmitter for a base station, which divides a pilot channel by a plurality of spreading codes before transmission in a CDMA communication system according to an embodiment of the present invention.

FIG. 9 illustrates a channel transmitter for a base station, which transmits a paging channel message, a quick paging channel message and a pilot channel in a sleep mode according to an embodiment of the present invention. For simplicity, FIG. 9 illustrates only orthogonal spreading and PN spreading schemes for the respective channels. That is, FIG. 9 omits showing channel coders, symbol repeaters, channel interleavers and signal mapping parts for the respective channels. An output node of a PN spreader 88 is connected to an IQ modulator which converts an output signal of the PN spreader 88 to an RF signal.

A transmitter for the pilot channel does not perform channel coding for a pilot signal. Therefore, the signal on the pilot channel is non-coded data, which is transmitted with the higher transmission power at the specific durations represented by reference numerals 32, 42 and 52 of FIGS. 3 to 5, or is transmitted by distributing the pilot channel to several spreading codes as shown in FIG. 8. That is, as illustrated in FIG. 9, the pilot channel signal is orthogonally spread by multipliers 80-0 to 80-n with several orthogonal codes W0' to Wn', and then gain-controlled by associated gain controllers 82-0 to 82-n. Thereafter, the gain controlled signals are spread by the PN spreader 88 with a common spreading code and then transmitted.

Symbols on the paging channel are transmitted at stated periods in the sleep mode as represented by reference numerals 31, 41 and 51 of FIGS. 3 to 5. A multiplier 54 orthogonally spreads the paging channel message with an assigned orthogonal code Wp.

The quick paging channel data is also not channel coded. Therefore, the quick paging channel data is transmitted at a predetermined time duration before transmission of the paging channel message in the sleep mode as represented by reference numerals 43 and 52 of FIGS. 4 and 5. A multiplier 72 multiplies the quick paging channel data by an orthogonal code assigned to the quick paging channel.

Further, the channel transmitters of the base station include other channel transmitters in addition to the transmitters for the pilot channel, the paging channel and the quick paging channel. The channel transmitters of FIG. 9 include a sync channel transmitter and M traffic channel transmitters, in addition to the pilot channel transmitter for transmitting a pilot channel using n Walsh codes, the paging channel transmitter and the quick paging channel transmitter.

In FIG. 9, at a designated time, a timing controller 81 controls gains of the respective channel transmitters. In the embodiment of FIG. 6 where the transmission power of the pilot channel is temporarily increased, the timing controller 81 controls gains of the respective channels at the time Tp to transmit the pilot channel with the transmission power being higher than the normal transmission power. For the time duration Tp, transmission power of the other channel transmitters are reduced to maintain a total transmission power of the base station. In FIG. 9, although the invention has been described with reference to an embodiment of a base station transmitter for the paging channel and the pilot channel in the sleep mode, the base station channel transmitter of FIG. 9 can be applied to any structure by properly adjusting gains of the respective channels.

Referring to FIG. 9, the multipliers 80-0 to 80-n multiply a pilot channel signal comprised of all '1's by associated orthogonal codes W0" to Wn" to spread the pilot channel signal. The gain controllers 82-0 to 82-n multiply the spread pilot channel signals output from the multipliers 80-0 to 80-n by associated gains G0 to Gn, under the control of the timing controller 81. Outputs of the gain controllers 82-0 to 82-n are added by adders 84, 86 and 68, and then multiplied by a common PN spreading code at a multiplier 88 before transmission.

A multiplier 50 multiplies a sync channel symbol by an orthogonal code Ws to spread the sync channel symbol, and a gain controller 52 multiplies the spread sync channel symbol by a gain $G_s$, under the control of the timing controller 81. Thereafter, an output of the gain controller 52 is added at an adder 66 and then multiplied by the common PN spreading code at the multiplier 88 before transmission.

A multiplier 54 multiplies a paging channel symbol by an orthogonal code $W_P$ to spread the paging channel symbol, and a gain controller 56 multiplies the spread paging channel symbol by a gain $G_P$, under the control of the timing controller 81. Thereafter, an output of the gain controller 56 is added at an adder 64 and then multiplied by the common PN spreading code at the multiplier 88 before transmission. Here, as described above, the paging channel symbol is transmitted in a unit of a specific time duration in the sleep mode.

A multiplier 72 multiplies quick paging channel data by an orthogonal code $W_{qp}$ to spread the quick paging channel data, and a gain controller 74 multiplies the spread quick paging channel data by a gain $G_{qp}$, under the control of the timing controller 81. Thereafter, an output of the gain controller 74 is added at an adder 76 and then multiplied by the common PN spreading code at the multiplier 88 before transmission. Here, as described above, the quick paging channel data is generated a predetermined time before the paging channel message is transmitted, in the sleep mode. The quick paging channel data is information representing existence/non-existence of the paging channel.

A multiplier 58-1 multiplies a data symbol on a first traffic channel by an orthogonal code $W_{T1}$ to spread the data symbol, and a gain controller 60-1 multiplies the spread data symbol by a gain $GT_1$, under the control of the timing controller 81. Thereafter, an output of the gain controller 60-1 is added at an adder 62 and then multiplied by the common PN spreading code at the multiplier 88 before transmission.

A multiplier 58-M multiplies a data symbol on an M-th traffic channel by an orthogonal code $W_{TM}$ to spread the data symbol, and a gain controller 60-M multiplies the spread data symbol by a gain $G_{TM}$, under the control of the timing controller 81. Thereafter, an output of the gain controller 60-M is added at the adder 62 and then multiplied by the common PN spreading code at the multiplier 88 before transmission.

As described above, the mobile station despreads the signals received for the time duration Tp in the sleep mode to detect signals transmitted from several base stations, and receives the paging channel message transmitted at stated periods to process the received paging channel message. At this point, which parameter the mobile station will measure depends on the objective of the mobile station. If the mobile station's objective is to measure a distance from the base station, a main measurement parameter of the mobile station will become a propagation delay. However, if the mobile station has an object of finger assignment or measurement for a handoff, the measurement parameter will become a propagation delay and a signal level of the respective multipath.

A receiver of the mobile station may use a conventional serial searcher in the process of searching the received despread signal. However, use of the conventional serial searcher causes an increase in the time duration Tp or Td. A searcher for a receiver, having the reduced time duration Tp or Td, can be implemented in the following methods, to perform despreading and searching.

In a first method, a matched filter is used for the searcher. The matched filter can rapidly calculate a correlation between a received signal and a locally generated spreading code. However, the matched filter is disadvantageous in that it increases complexity of a receiver and power consumption.

For this reason, it is hard to implement the matched filter. In particular, when a pilot channel has low power, an integrating time should be increased in calculating a correlation between a received signal and a locally generated spreading code. It is difficult to apply a matched filter having a long integrating time to a mobile station. However, by matching an operating time of the matched filter to a time where a ratio of transmission power of a pilot channel proposed by the invention to the total transmission power of the base station is temporarily changed, the matched filter can reduce the integrating time required in calculating the correlation value. Further, the base station changes the ratio of the pilot channel power to the total transmission power in a regular sequence, and the matched filter of the mobile station can perform despreading with a spreading code for the base station which has temporary ratio of the pilot channel power and the total transmission power. Of course, it is possible to calculate a correlation between a received signal and a spreading code using a matched filter, even in the embodiment of FIG. 5. At this point, it is possible to either perform despreading for the received signal with a spreading code for the base station or store the received signal in a memory to perform despreading for the stored signal later in regular sequence.

In a second method, a signal received at around the time duration Tp or Td is stored in a memory to calculate a correlation between the signal and a locally generated spreading code. Though requires a memory for storing the received signal, this method has a simple despreading process and reduced power consumption. In this method, a serial searcher is used for the searcher.

In an exemplary embodiment of the present invention, the searcher is implemented in the second method.

Figure 10:
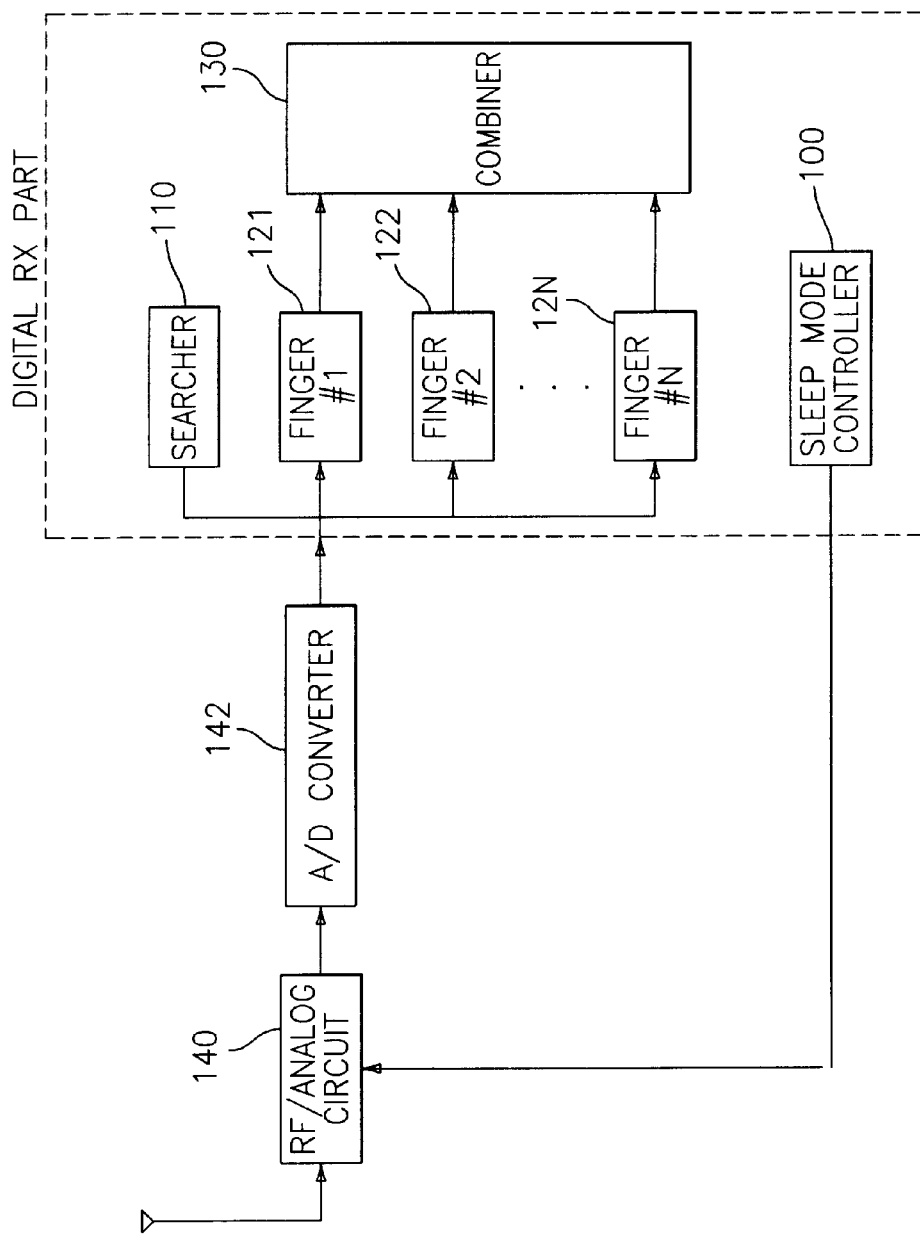
FIG. 10 is a diagram illustrating a receiver for a mobile station.

FIG. 10 illustrates a receiver for a mobile station according to an embodiment of the present invention. A sleep mode controller 100 controls supply of power to an RF/analog stage 140 as shown by reference numerals 33, 44 and 54 of FIGS. 3 to 5, in the sleep mode according to the present embodiment. The RF/analog stage 140 receives channel signals transmitted from a base station through the forward link and converts the received signals into baseband signals. An analog-to-digital (A/D) converter 142 converts analog signals output from the RF/analog stage 140 to digital signals. A searcher 110 receives a pilot channel signal from the base station to perform base station acquisition and finger assignment. Fingers 211–12N calculate correlation values among channel signals transmitted from base stations, to perform channel searching.

Figure 11:
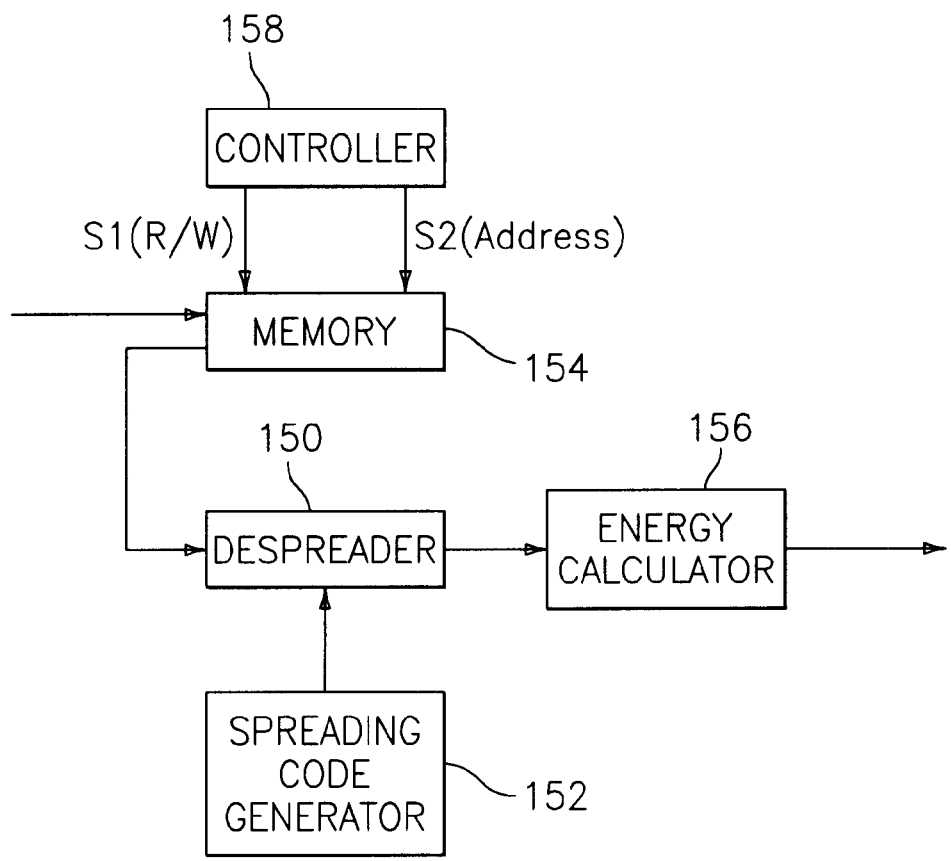
FIG. 11 is a diagram illustrating a searcher in the receiver of FIG. 10 according to an embodiment of the present invention.

FIG. 11 illustrates the searcher 110 of FIG. 10 in detail. Referring to FIG. 11, the searcher 110 according to the present invention includes a despreader 150, a spreading code generator 152, a memory 154 for storing received signals, an energy calculator 156 and a controller 158. The memory 154, under the control of the controller 158, stores signals received around the time duration Tp or Td. The controller 158 applies a read/write control signal S1 to the memory 154 to enable the memory 154 to store input signals at around the time duration Tp or Td, and applies an address control signal S2 for designating an address of the memory 154, where the input signals are to be stored. Upon every receipt of the input signal, the controller 158 increases the address of the memory 154 by generating the address control signal S2 to store the input signal at the new address of the memory 154. After storage of the input signal in the memory 154, the controller 158 outputs the signals stored in the memory 154 to the despreader 150 by generating the read/write control signal S1 and the address control signal S2. The spreading code generator 152 generates a local spreading code which is identical to a spreading code used in a transmitter of a base station, and provides the generated spreading code to the despreader 150. The despreader 150 multiplies the received signal read from the memory 154 by the local spreading code generated from the spreading code generator 152 and integrates the multiplied signal for a predetermine duration. The spreading code generator 152 locally generates a spreading code and a Walsh code. The energy calculator 156 calculates energy of the despread signal. To calculate energy of the despread signal, the energy calculator 156 calculates the sum of the despread signals for I and Q arms (i.e., I2+Q2). This value is Ec/Io of a received pilot channel, where Ec represents energy per chip of the received signal and Io represents a power spectral density of the received total CDMA signal.

Figure 12:
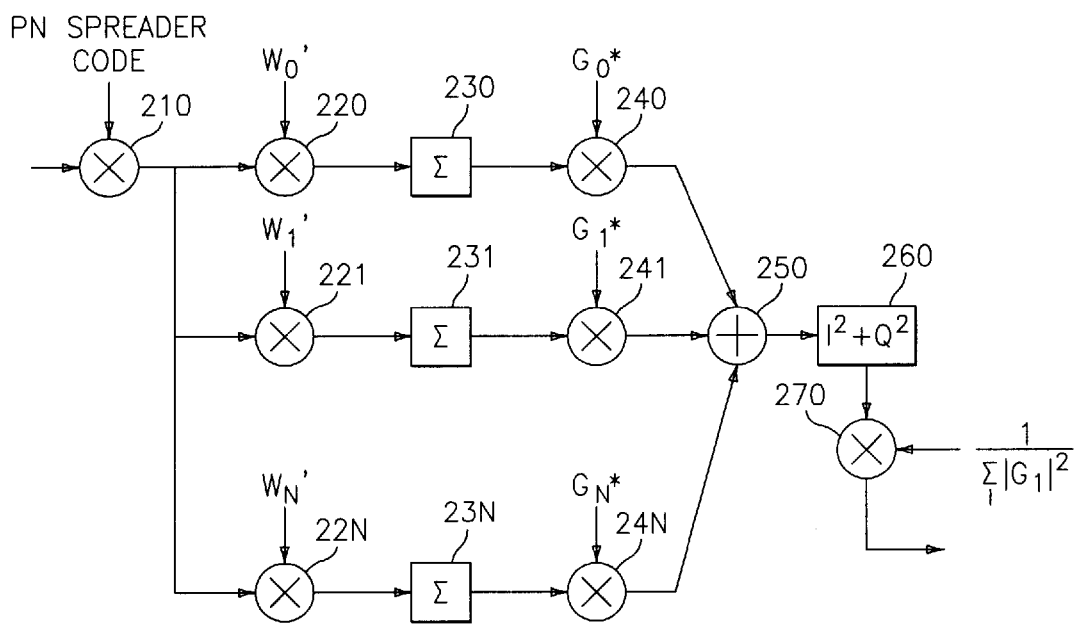
FIG. 12 is a diagram illustrating a despreader of FIG. 11 according to a first embodiment of the present invention.

FIG. 12 illustrates a despreader of a receiver according to a first embodiment of the present invention, which despreads the pilot spread with several spreading codes as shown in FIGS. 7 and 8. The despreader of FIG. 12 spreads a pilot channel of the base station with plural orthogonal codes W0' to Wn' and then, spreads the spread signals with a common PN spreading code. In FIG. 12, all the signals are complex signals.

Referring to FIG. 12, a multiplier 210 multiplies a received signal by a PN spreading code to despread the received signal. Multipliers 220–22N multiply the despread signal output from the multiplier 210 by associated orthogonal codes $W_0'$ to $W_N'$ to perform orthogonal demodulation for the despread signal. Accumulators 230–23N accumulate outputs of the associated multipliers 220–22N for a predetermined time. The respective accumulators 230–23N may have different accumulating times. This is because a pilot channel spread with the spreading code $W_0'$, which is continuously transmitted even in a normal time, can be accumulated for a longer time. In this case, a gain of the receiver should be changed in consideration of the particular accumulating time. In this embodiment, it is assumed that the accumulators for receiving the respective orthogonal code channels have a fixed accumulating duration. Multipliers 240–24N multiply outputs of the associated accumulators 230–23N by associated complex gains $G_0^*$–$G_N^*$ for phase compensation. An adder 250 adds outputs of the multipliers 240–24N, and a squarer 260 squares an output of the adder 250 to convert the output of the adder 250 to an energy value. A multiplier 270 multiplies the energy value by $$\frac{1}{\sum_i |G_i|^2}$$

to normalize the output of the squarer 260.

As illustrated in FIG. 12, the input signal is multiplied by the PN spreading code at the multiplier 210 to be despread, and the despread signal is multiplied by the corresponding orthogonal codes at the multipliers 220–22N to be orthogonally demodulated. The signals output from the multipliers 220–22N are accumulated at the associated accumulators 230–23N on a symbol unit basis. Further, the multipliers 240–24N multiply the outputs of the accumulators 230–23N by associated gains $G_0^*$–$G_N^*$ to compensate phase components of the complex gains multiplied by the respective orthogonal channels. The phase compensated signals are combined by the adder 250. The squarer 260 converts the combined signal output from the adder 250 to an energy value. The multiplier 270 multiplies the energy value by $$\frac{1}{\sum_i |G_i|^2}$$

to normalize the output of the squarer 260. That is, the multiplicand for gain compensation is a reciprocal of the sum of the squared complex gain Gi (i=0,1,2, ... ,n). Here, the multiplier 270 is used to obtain a good gain compensation, and is optional.

The despreader of FIG. 12 despreads the received signal, accumulates the despread signal on a symbol unit basis and then calculates the energy of the accumulated signal.

In the despreader of FIG. 12, (n+1) despreading elements despread the received signal in parallel. However, the receiver can despread only a part of the (n+1) orthogonal codes transmitted from the base station. That is, the receiver can perform despreading for a part of or all of the orthogonal codes assigned to the pilot channels shown in FIG. 7 in accordance with the number of finger, which are typically three in number.

Figure 13:
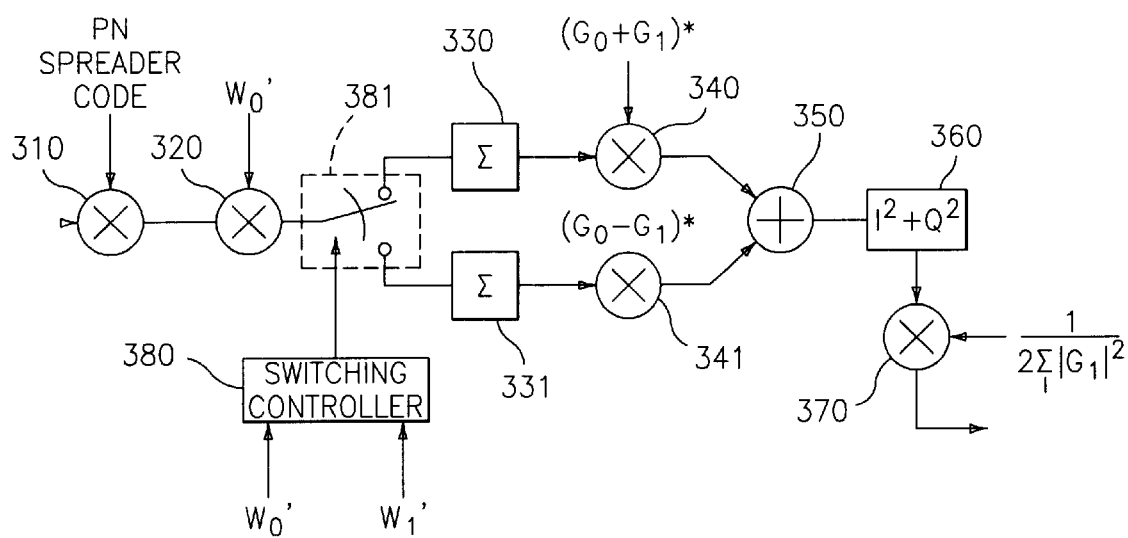
FIG. 13 is a diagram illustrating a despreader of FIG. 11 according to a second embodiment of the present invention.

FIG. 13 illustrates a despreader of a mobile station according to a second embodiment of the present invention, for the case where a transmitter of a base station spreads a pilot channel using a plurality of orthogonal codes. A despreading method according to the second embodiment aims to reduce power consumption by grouping input signals having the same spreading code, unlike the first embodiment of FIG. 12 wherein input signals are simultaneously despread with several spreading codes. Although FIG. 13 shows a case where two orthogonal codes are used, this structure can be applied even to a despreader which uses three or more orthogonal codes. In FIG. 13, all the signals are complex signals.

Referring to FIG. 13, a multiplier 310 multiplies an input signal by a PN spreading code to despread the input signal. A multiplier 320 multiplies an output of the multiplier 310 by an orthogonal code to generate an orthogonally demodulated output signal. Here, the orthogonal code applied to the multiplier 320 is assumed to be an orthogonal code $W_0'$. A switch controller 380 receiving orthogonal codes $W_0'$ and $W_1'$, searches the two orthogonal codes on a chip unit basis, to generate a control signal for selecting a first path when $W_0'(i)=W_1'(i)$, and generate a control signal for selecting a second path when $W_0'(i)\ne W_0'(i)$. The orthogonal code $W_0'(i)$ represents an i-th chip of the orthogonal code $W_0'$ and the orthogonal code $W_1'(i)$ represents an i-th chip of the orthogonal code $W_1'$. A switch 381 has an input node connected to the multiplier 320, a first output node connected to the first path and a second output node connected to the second path. The switch 381 switches the output of the multiplier 320 to the first path or the second path according to an output of the switch controller 380.

An accumulator 330 connected to the first path, accumulates input signals on a symbol unit basis. A multiplier 340 multiplies an output of the accumulator 330 by a complex gain $(G_0+G_1)^*$ to compensate a phase gain of the signal output through the first path. The signals switched to the first path are the chips, for the orthogonal codes have the same sign. An accumulator 331 connected to the second path, accumulates input signals on a symbol unit basis. A multiplier 341 multiplies an output of the accumulator 331 by a complex gain $(G_0-G_1)^*$ to compensate a phase gain of the signal output through the second path. The signals switched to the second path are the chips, for the orthogonal code having different signs. An adder 350 combines outputs of the multipliers 340 and 341, and a squarer 360 squares an output of the adder 350 to convert it to an energy value. A multiplier 770 multiplies the energy value by a complex gain $$\frac{1}{2\sum_i |G_i|^2}$$

to normalize the output of the squarer 360.

First, an operation of the despreader shown in FIG. 13 will be described theoretically. Herein, it is assumed that the orthogonal code $W_0$ and $W_1$ used in FIG. 13 have a length of 8 chips (i=8). Further, it is assumed that the orthogonal code $W_0$" has a pattern of +1,+1,+1,+1,–1,–1,–1,–1, and the orthogonal code $W_1$" has a pattern of +1,+1,–1,–1,+1,+1,–1,–1. Then, the orthogonal codes $W_0$ and $W_0$ expressed in Table 1.

TABLE 1

| Orthogonal Code | Chip Number | | | | | | | |
|---|---|---|---|---|---|---|---|---|
| | i1 | i2 | i3 | i4 | i5 | i6 | i7 | i8 |
| $W_0'$ | +1 | +1 | +1 | +1 | –1 | –1 | –1 | –1 |
| $W_1'$ | +1 | +1 | –1 | –1 | +1 | +1 | –1 | –1 |

Further, when the input signals of the despreader are r1, r2, r3, r4 , r5, r6 ,r7 and r8, and the gains G0 and G1 multiplied by the respective orthogonal codes are real numbers, the signals despread with the spreading code W0" in the receiver having the structure of FIG. 13 can be expressed as $Y0=G0*(r1+r2+r3+r4-r5-r6-r7-r8)$ $Y1=G1*(r1+r2-r3-r4+r5+r6-r7-r8)$ A final output of the despreader becomes Y0+Y1.

The orthogonal codes W0" and W1" have the same chip components at first, second, seventh and eighth locations, and have different chip components at third, fourth, fifth and sixth locations. Components of the final output, Y0+Y1, of the despreader are classified according to whether the corresponding chip components of the orthogonal codes W0" and W1" are identical or different, as follows:

$X0=(G0*+G1*)(r1+r2-r7-r8)$ $X1=(G0*-G1*)(r3+r4-r5-r6)$

Here, X0+X1=Y0+Y1. As shown in the above formulas, by classifying the input signals according to the combination of the chip components of the respective orthogonal codes, it is possible to reduce additions performed during despreading. Though ineffective against a shorter orthogonal code, this is highly effective against a longer orthogonal code.

FIG. 13 shows a hardware structure for the above description. In FIG. 13, the input signals is multiplied by the PN spreading code at the multiplier 310 and then multiplied by the orthogonal code W0 at the multiplier 320. The switch controller 380 compares two orthogonal codes to determine whether the corresponding components thereof are identical to each other, and generates a switching control signal according to the comparison results. The switch 381 switches the output of the multiplier 320 to the accumulators 330 and 340 according to the switching control signal. When the chip components of the two orthogonal codes W0" and W1" are identical, the output signal of the multiplier 320 is input to the accumulator 330 located in the first path. Otherwise, when the chip components are different, the output signal of the multiplier 320 is input to the accumulator 331 located in the second path. In addition, the divided signals are accumulated at the corresponding accumulators 330 and 331 on the symbol unit basis. Thereafter, the multiplier 340 multiplies the output of the accumulator 330 by the gain G0*+G1*, and the multiplier 341 multiplies the output of the accumulator 331 by the gain G0*−G1*. The adder 350 adds the outputs of the multipliers 340 and 341. Output of the adder 350 is squared by the squarer 360 to be converted to an energy value. The multiplier 370 multiplies the output of the squarer 360 by $$\frac{1}{2\sum_i |G_i|^2}$$

to normalize the outputs of the multipliers 340 and 341.

In the case where the pilot is transmitted with several spreading codes in the above receiver structure, the mobile station needs to know the ratio of the transmission powers assigned to the respective orthogonal codes or gain values for the respective orthogonal codes. This can be previously determined in a standardizing process, or the base station can inform this to the mobile station using a system parameter. In addition, the receiver can measure this using a simple algorithm. Alternatively, this can also be estimated by calculating an energy ratio of despread signals for the respective orthogonal codes.

Figure 14:
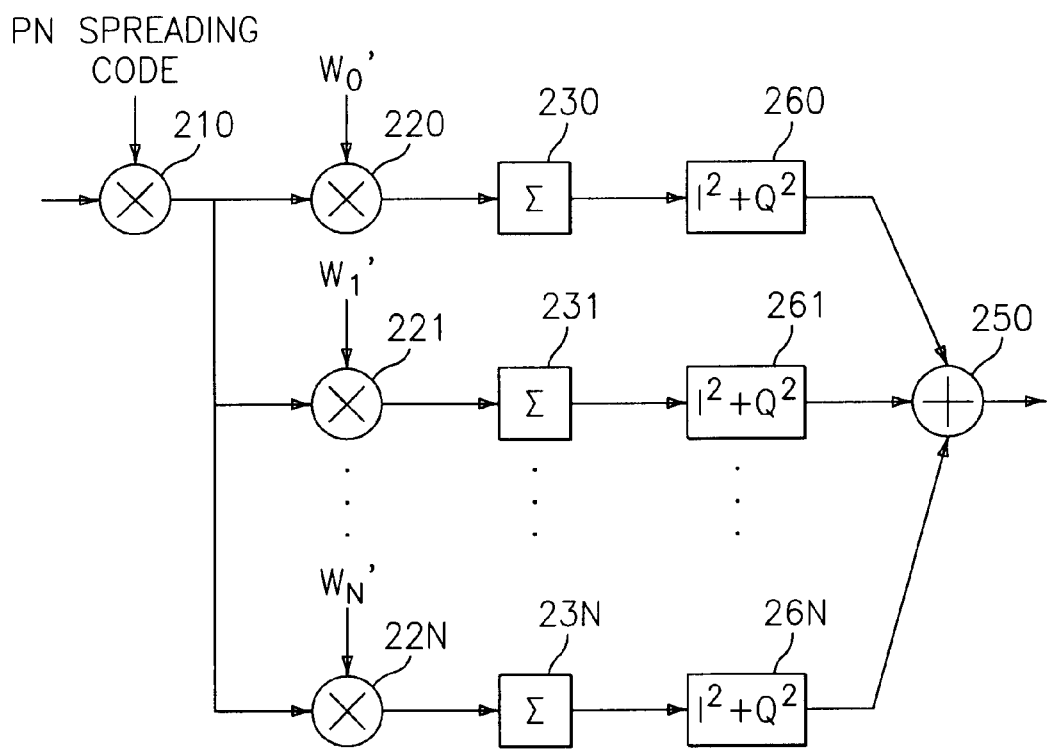
FIG. 14 is a diagram illustrating a despreader of FIG. 11 according to a third embodiment of the present invention.

FIG. 14 illustrates a despreader of a receiver according to a third embodiment of the present invention, for the case where the pilot is spread with several spreading codes as show in FIGS. 7 and 8. In the third embodiment of the FIG. 14, the pilot channel of the base station is spread with plural orthogonal codes W0" to Wn" and then, spread with a common PN spreading code. In FIG. 14, all the signals are complex signals.

Referring to FIG. 14, a multiplier 210 multiplies a received signal by a PN spreading signal to despread the received signal. Multipliers 220–22N multiply the despread signal output from the multiplier 210 by associated orthogonal codes W0-WN to orthogonally demodulate the despread signal. Accumulators 230–23N accumulate outputs of the associated multipliers 220–22N on the symbol unit basis. Squarers 260–26N square outputs of the associated accumulators 230–23N to convert them to energy values. An adder 250 combines outputs of the squarers 260–26N.

The despreader of FIG. 14 despreads the received signal, accumulates the despread signal on the symbol unit basis to calculate energy values, and then combines the calculated energy values. FIG. 14 is a detailed diagram illustrating the despreader 150 and the energy calculator 156 of FIG. 11. Unlike the other despreaders, the despreader and the energy calculator of FIG. 14 separately calculates energies of the respective channel and combines the calculated energies. The despreaders of FIGS. 12 and 13 coherently add the despread values of the respective channels, whereas the despreader of FIG. 14 first calculates the energies of the respective channels and then adds the calculated energies. The despreader of FIG. 14 undergoes more performance degradation as compared with the despreaders of FIGS. 12 and 13. However, the despreader of FIG. 14 is advantageous in that it can calculate a power ratio of the pilot channels received from the respective base stations, even though it does know gains of the respective channels.

In the case where a neighbor frequency search is performed for a hard handoff between frequencies in the IMT-2000 standardizing process, a mobile station temporarily discontinues receipt of an f1 frequency signal being currently received, shifts to an adjacent frequency f2 to be searched, and then stores an input signal of the adjacent frequency f2 in a memory. Thereafter, the mobile station quickly shifts to the frequency f1 received previously, and continues to receive the f1 frequency signal. The mobile station requires a memory for storing the adjacent frequency signal. If the duration where the adjacent frequency signal is stored in the memory is identical to the duration Tp or Td where a ratio of the transmission power of the pilot channel to the total transmission power of the base station, it is possible to decrease the capacity of the memory required in storing the adjacent frequency signal. When the transmission power of the pilot channel is lower by −12 dB that the total transmission power of the base station on the assumption that an influence of a propagation delay is negligible, it is possible to obtain the result that the conventional structure can obtain by storing 4000 chips, by simply storing 256 or 512 chips for the time Tp.

The base station transmitter of FIG. 9 and the mobile station receiver of FIGS. 10 to 14 have been described for the case where the pilot channel is transmitted with the high transmission power using a plurality of orthogonal codes. However, the pilot channel can also be transmitted using one orthogonal code. In this case, the despreader can include a multiplier for multiplying an input signal by a PN spreading code to despread the input signal, a multiplier for multiplying the despread pilot signal by an orthogonal code for the pilot channel to orthogonally modulate the despread pilot signal, and an accumulator for accumulating the orthogonally demodulated pilot signal on the symbol unit basis.

In summary, a CDMA communication system employing the new pilot signal transmission method and the new sleep mode operation algorithm has the following advantages:
(1) It is possible to perform effective set maintenance and reacquisition.
(2) A mobile station can acquire and manage signals from the increased number of base stations.
(3) A mobile station can acquire signals from adjacent base stations with reduced power consumption and reduced hardware complexity.
(4) A mobile station can acquire and manage the increased number of base stations and obtain a power saving effect by storing received signals in a memory and processing the stored signals.
(5) By employing a new pilot transmission method, sampled data of the pilot channel is stored in a memory during a slotted mode operation to perform a search operation, and the result can be applied to sector selecting and filter assignment for demodulation of a quick paging channel.
(6) The CDMA system increases energy of a pilot signal for a short time to perform set maintenance using only a searcher for that time in a sleep mode, and increases probability of pilot acquisition and reduces acquisition time, thereby saving the battery power.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for communicating a common channel message in a code division multiple access (CDMA) communication system, comprising:

a base station transmitter including a specific channel transmitter for outputting a channel signal on a specific channel at a second transmission power level for a predetermined time duration and otherwise outputting the channel signal at a first transmission power level, and a common channel transmitter for transmitting a common channel message at an assigned slot duration; and a receiver of a mobile station, wherein a power supply voltage is provided to the receiver at said predetermined time duration before said assigned slot duration and at said assigned slot duration to enable the receiver, and wherein the power supply voltage to the receiver is otherwise disengaged whereby the receiver operates in a sleep mode.

2. The device as claimed in claim 1, wherein said receiver further comprises a searcher which is enabled when said receiver is enabled to store the received signal on the specific channel, and for estimating the received signal on the specific channel to perform channel acquisition.

3. The device as claimed in claim 2, wherein the step of estimating the received signal by said searcher comprises sampling the receiving signal by said searcher when said receiver is enabled, storing the sampled signal, searching the stored signal of the specific channel during the sleep mode and performing sector selecting and finger assignment in accordance with the search results.

4. The device as claimed in claim 3, wherein the searcher comprises:

a memory for storing the signal on the specific channel;

a despreader for despreading the signal on the specific channel, output from the memory;

an energy calculator for calculating the energy of the despread signal; and a channel estimator for estimating a channel from an output of the energy calculator.

5. The device as claimed in claim 2, wherein the specific channel is a pilot channel and the common channel is a paging channel.

6. The device as claimed in claim 5, wherein a pilot channel transmitter of the base station generates a pilot channel signal for transmitting an increased transmission power at the predetermined time using at least two spreading codes, and wherein said searcher for performing despreading using the spreading codes at the predetermined time to perform searching.

7. The device as claimed in claim 6, wherein the pilot channel received at said second transmission power as one to four symbols.

8. A device for communicating a common channel message in a CDMA communication system, comprising:

a base station transmitter including;

a pilot channel transmitter for outputting a specific channel signal at a second transmission power for a predetermined time duration and otherwise outputting the channel signal at a first transmission power level; and a paging channel transmitter for transmitting a paging channel message at an assigned slot duration; and a mobile station receiver comprising:

a radio frequency (RF) receiver being enabled for said predetermined time duration and for said assigned slot duration, and otherwise operating in a sleep mode;

a searcher enabled when said RF receiver is enabled, for storing the received pilot signal and searching the receiver pilot signal to perform channel acquisition; and fingers enabled at the assigned slot duration, for processing a received message.

9. The device as claimed in claim 8, wherein the step of searching the received pilot signal comprises sampling the receiving signal by said searcher when said receiver is enabled, storing the sampled signal, searching the stored signal of the specific channel during the sleep mode and performing sector selecting and finger assignment in accordance with the search results.

10. The device as claimed in claim 9, wherein the searcher comprises:

a memory for storing the signal on the specific channel;

a despreader for despreading the signal on the specific channel, output from the memory;

an energy calculator for calculating energy of the despread signal; and a channel estimator for estimating a channel from an output of the energy calculator.

11. The device as claimed in claim 10, wherein a pilot channel transmitter of the base station generates a pilot signal using a specific orthogonal code assigned to a pilot channel when transmitting the pilot signal at the first transmission power level, and further generates a pilot signal using at least two orthogonal codes when transmitting the pilot signal at the second transmission power level; wherein the despreader of the mobile station despreads a received pilot channel signal using the at least two orthogonal codes.

12. A method for communicating a common channel message in a CDMA communication system, wherein a base station outputs a channel signal at a second transmission power level for a predetermined time duration and otherwise outputs the channel signal at a first transmission power level, the method comprising the steps of:

providing a power supply voltage to a receiver of a mobile station for said predetermined time duration before a slot duration assigned to receive the common channel message and for the assigned slot duration, causing said receiver to exit a sleep mode; and cutting off the power supply voltage at time intervals other than said predetermined time duration and said slot duration to perform the sleep mode.

13. The method as claimed in claim 12, further comprising the step of sampling a received pilot signal having the second transmission power, storing the sampled signal, searching the stored pilot channel signal during the sleep mode, to perform channel acquisition, and performing sector selecting and finger assignment according to the search results.

14. A method for communicating a common channel message in a CDMA communication system, wherein a base station outputs a pilot signal at a second transmission power for a predetermined time duration and otherwise outputs the pilot signal at a first transmission power level, the method comprising the steps of:

providing a power supply voltage to a receiver of a mobile station for said predetermined time duration, said predetermined time duration occurring prior to a slot duration pre-assigned to receive a common channel message, to release a sleep mode and store the received pilot signal, and re-enter the sleep mode after receipt of the pilot channel signal;

searching the stored pilot signal during the sleep mode, and performing sector selecting and finger assignment according to the channel acquisition results; and providing a power supply voltage to said receiver at the assigned slot duration to exit the sleep mode, receiving the common channel message, enabling the assigned fingers to process the received common channel message, and re-entering the sleep mode after processing the common channel message.

15. A device for transmitting a common channel message for a base station in a CDMA communication system, comprising:

a pilot channel transmitter for outputting a pilot signal at a second transmission power level for a predetermined time duration and otherwise outputting the pilot signal with first transmission power at other time duration;

a paging channel transmitter for transmitting a paging message at an assigned slot duration; and a quick paging channel transmitter for transmitting a quick paging channel message indicating one of existence and non-existence of the common channel message prior to the assigned slot duration.

16. The device as claimed in claim 15, wherein the pilot channel transmitter comprises:

a first spreader for spreading the pilot signal with a first orthogonal code to generate a pilot signal having the first transmission power level;

a second spreader for spreading the pilot signal with at least one orthogonal code other than the first orthogonal code to generate a pilot signal, the second spreader being enabled on a slot unit basis; and an adder for adding outputs of the first and second spreaders to generate a pilot signal.

17. A device for receiving a common channel message for a mobile station in a CDMA communication system, wherein a base station outputs a pilot signal at a second transmission power level for a predetermined time duration and otherwise outputs the pilot signal at a first transmission power level, and transmits a quick paging message representing one of an existence and non-existence of a paging message before a slot duration assigned to transmit the common channel message, the device comprising:

a receiver which is provided with a power supply voltage for time durations including said predetermined time duration, a quick paging message duration and an assigned slot duration, to perform a receiving operation, said receiver being otherwise disengaged from the power supply voltage to re-enter a sleep mode;

a searcher for storing the pilot signal received at the second transmission power level, and searching the pilot signal to perform channel acquisition; and fingers for receiving the quick paging channel message to determine one of an existence or non-existence of the assigned slot, the fingers being enabled only when the message is received to process the received message.

18. A method for transmitting a message on a common channel for a base station in a CDMA communication system, comprising the steps of:

transmitting a pilot signal with transmission power higher than a normal transmission power at predetermined periods;

transmitting a quick paging channel message indicating one of the existence and non-existence of the common channel message before a paging slot duration assigned to a specific mobile station; and transmitting a paging message at the assigned paging slot duration.

19. A method for receiving a common channel message for a mobile station in a CDMA communication system, wherein a base station outputs a pilot signal at a second transmission power level for a predetermined time duration and otherwise outputs the pilot signal at a first transmission power level, and transmits a quick paging message representing one of a an existence and non-existence of a paging message before a slot duration assigned to transmit the common channel message, the method comprising the steps of:

providing a power supply voltage to an RF receiver for said predetermined time duration, to receive and store the pilot signal, and disengaging the power supply voltage to the RF receiver to search the stored pilot signal in a sleep mode and perform channel acquisition;

exiting the sleep mode for a duration defined by the transmission time of the quick paging channel message, re-entering the sleep mode, and analyzing the received quick paging message to determine one of an existence and non-existence of the assigned slot; and when the message exists, exiting the sleep mode at the assigned slot duration, to process the received message and then proceeds to the sleep mode, and otherwise, re-entering the sleep mode at the assigned slot duration.

* * * * *